(12) United States Patent
Masuda

(10) Patent No.: US 11,362,892 B2
(45) Date of Patent: Jun. 14, 2022

(54) COMMUNICATION DEVICE, CERTIFICATION METHOD, AND COMPUTER READABLE RECORDING MEDIUM FOR RECERTIFICATION OF DEVICES

(71) Applicant: Panasonic Intellectual Property Management Co., Ltd., Osaka (JP)

(72) Inventor: Yoichi Masuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/856,929

(22) Filed: Apr. 23, 2020

(65) Prior Publication Data

US 2020/0412613 A1    Dec. 31, 2020

(30) Foreign Application Priority Data

Jun. 26, 2019  (JP) .............................. JP2019-118120

(51) Int. Cl.
*H04L 41/0823* (2022.01)
*H04L 12/18* (2006.01)

(52) U.S. Cl.
CPC ........ *H04L 41/0823* (2013.01); *H04L 12/185* (2013.01)

(58) Field of Classification Search
CPC .......................... H04L 41/0823; H04L 12/185
USPC ........................................................ 709/221
See application file for complete search history.

(56) References Cited

U.S. PATENT DOCUMENTS

| | | | | |
|---|---|---|---|---|
| 8,181,016 | B1 * | 5/2012 | Borgia | G06F 21/6218 713/156 |
| 8,656,153 | B2 * | 2/2014 | Xiao | H04W 12/0433 713/155 |
| 8,687,216 | B2 * | 4/2014 | Niimura | G06F 21/34 358/1.14 |
| 9,591,016 | B1 * | 3/2017 | Palmieri | H04L 63/1433 |
| 9,607,142 | B2 * | 3/2017 | Dharmarajan | G06F 21/45 |
| 9,749,981 | B2 * | 8/2017 | Yared | H04L 45/22 |
| 9,918,319 | B2 * | 3/2018 | Borenstein | H04W 72/048 |
| 10,243,994 | B2 * | 3/2019 | Matthiesen | H04L 63/20 |
| 10,440,029 | B2 * | 10/2019 | Hidden | H04L 63/108 |
| 10,567,216 | B2 * | 2/2020 | Yu | H04L 43/0817 |
| 10,986,082 | B2 * | 4/2021 | Singleton, IV | G06F 9/45558 |
| 2002/0196764 | A1 | 12/2002 | Shimizu | |
| 2003/0123172 | A1 * | 7/2003 | Zhu | G11B 5/59633 360/31 |
| 2016/0330071 | A1 * | 11/2016 | Moore | H04L 41/0816 |
| 2017/0063873 | A1 * | 3/2017 | Hidden | H04L 63/20 |

(Continued)

FOREIGN PATENT DOCUMENTS

| | | |
|---|---|---|
| JP | 2003-005641 A | 1/2003 |
| JP | 2014-107637 A | 6/2014 |

*Primary Examiner* — David P Zarka
(74) *Attorney, Agent, or Firm* — McDermott Will & Emery LLP

(57) ABSTRACT

A home energy management system (HEMS) controller certifies a plurality of devices participating in an HEMS network. When a request for re-certification is issued to a given device among the plurality of devices and when a response is not available from the device, the HEMS controller suspends a re-certification process for the device and performs a re-certification process for another device first.

4 Claims, 8 Drawing Sheets

(56) References Cited

U.S. PATENT DOCUMENTS

2018/0321724 A1\* 11/2018 Subramanian .......... H04L 67/22
2019/0268328 A1\* 8/2019 Hussein ................ H04L 63/104

\* cited by examiner

COMMUNICATION DEVICE, CERTIFICATION METHOD, AND COMPUTER READABLE RECORDING MEDIUM FOR RECERTIFICATION OF DEVICES

BACKGROUND ART

1. Field of the Invention

The present disclosure relates to communication technology and, more particularly, to a communication device, a certification method, and a computer program.

2. Description of the Related Art

Recently, it is envisaged that home energy management systems (HEMS) for managing energy used at home will be used popularly. An HEMS controller for managing an HEMS certifies a device requesting participation in the HEMS and, when certification of the device is successful, accepts the device into the HEMS (see, for example, patent document 1).

[patent literature 1] JP2014-107637

As many as several tens of devices may be certified by an HEMS controller and participate in an HEMS. The HEMS controller certifies the devices again at restart. In the event of a poor communication condition, however, a long period of time may be required to complete re-certification.

SUMMARY

The present disclosure addresses the above-described issue, and an illustrative purpose thereof is to reduce the time required for re-certification of a plurality of devices.

A communication device according to an embodiment of the present disclosure includes: a communication interface that communicates with a plurality of devices participating in a network; and a certifier that certifies the plurality of devices via the communication interface. When a request for re-certification is issued to a given device among the plurality of devices and when a response is not available from the device, the certifier suspends a re-certification process for the device and performs a re-certification process for another device first.

Another embodiment of the present disclosure relates to a communication device. The device includes: a communication interface that communicates with a plurality of devices participating in a network; and a certifier that certifies the plurality of devices via the communication interface. When the plurality of devices should be re-certified, the certifier performs a re-certification process for each device, provides keys for unicast communication that differ from one device to another, and provides, after the keys for unicast communication are provided to the respective devices, a key for multicast communication common to the plurality of devices to the respective devices by multicast communication.

Another embodiment of the present disclosure relates to a certification method. The method includes: issuing, using a communication device that certifies a plurality of devices participating in a network, a request for re-certification to a device among the plurality of devices; and when a response from the device to which the request for re-certification is issued is not available, suspending, using the communication device, a re-certification process for the device and performing a re-certification process for another device first.

Optional combinations of the aforementioned constituting elements, and implementations of the present disclosure in the form of systems, computer programs, recording mediums recording computer programs, etc. may also be practiced as additional modes of the present disclosure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

The disclosure will now be described by reference to the preferred embodiments. This does not intend to limit the scope of the present disclosure, but to exemplify the disclosure.

The device or the entity that executes the method according to the disclosure is provided with a computer. By causing the computer to run a program, the function of the device or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). Although the terms IC and LSI are used herein, circuits with different densities are referred to by different terms, and the processor may be a very large scale integration (VLSI) or an ultra large scale integration (USLI). A field programmable gate array (FPGA) programmed after the LSI is manufactured, or a reconfigurable logic device, in which connections inside the LSI are reconfigurable or circuitry blocks inside the LSI can be set up, can be used for the same purpose. The plurality of electronic circuits may be integrated in one chip or provided in a plurality of chips. The plurality of chips may be aggregated in one device or provided in a plurality of devices. The program is recorded in a non-transitory recording medium such as a computer-readable ROM, optical disk, and hard disk drive. The program may be stored in a recording medium in advance or supplied to a recording medium via wide area communication network including the Internet.

First Embodiment

Figure 1:
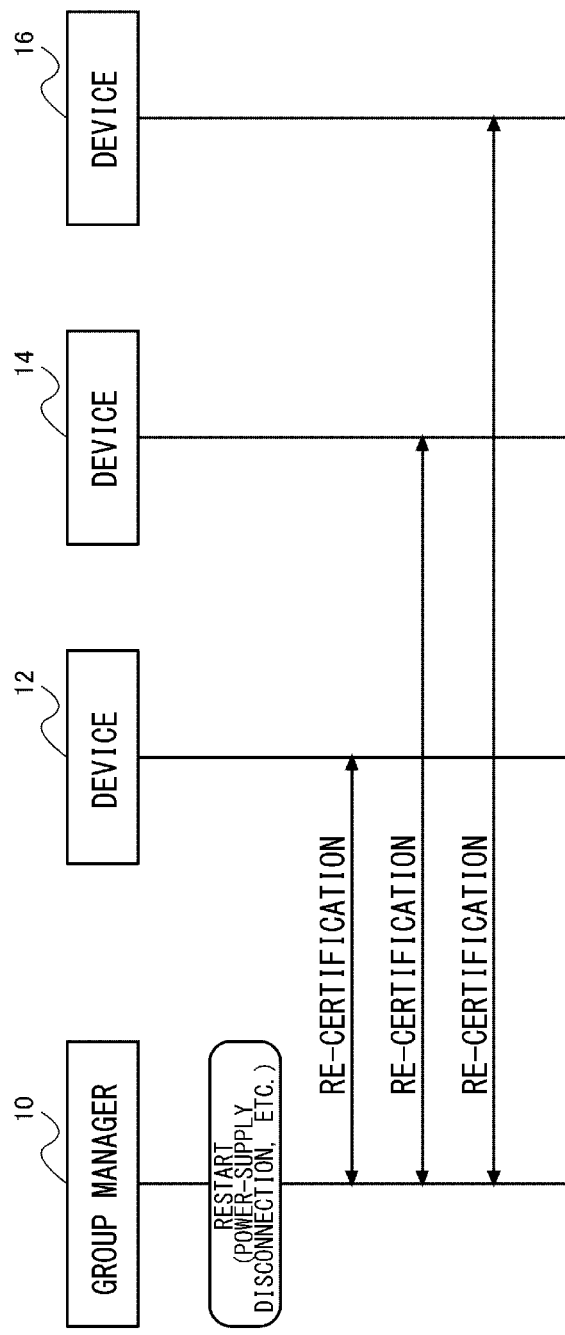
FIG. 1 schematically shows an operation of a group manager after restart.

A description will first be given of a summary. FIG. 1 schematically shows an operation of a group manager after restart. The group manager 10 certifies a plurality of devices participating in a predefined network (in this embodiment, an HEMS network). The group manager 10 delivers keys for communication data encryption that differ from one device to another (also called "group keys") to devices (which include a device 12, a device 14, and a device 16 in FIG. 1) that are successfully certified.

The group manager 10 may be restarted when the power supply recovers from disconnection or in response to a user operation by a manager, or the like. As shown in FIG. 1, the group manager 10 recertifies, at restart, all devices (the device 12, the device 14, the device 16) participating in the HEMS network and re-delivers the group keys to the respective devices in order to prevent inconsistency in the group keys.

Figure 2:
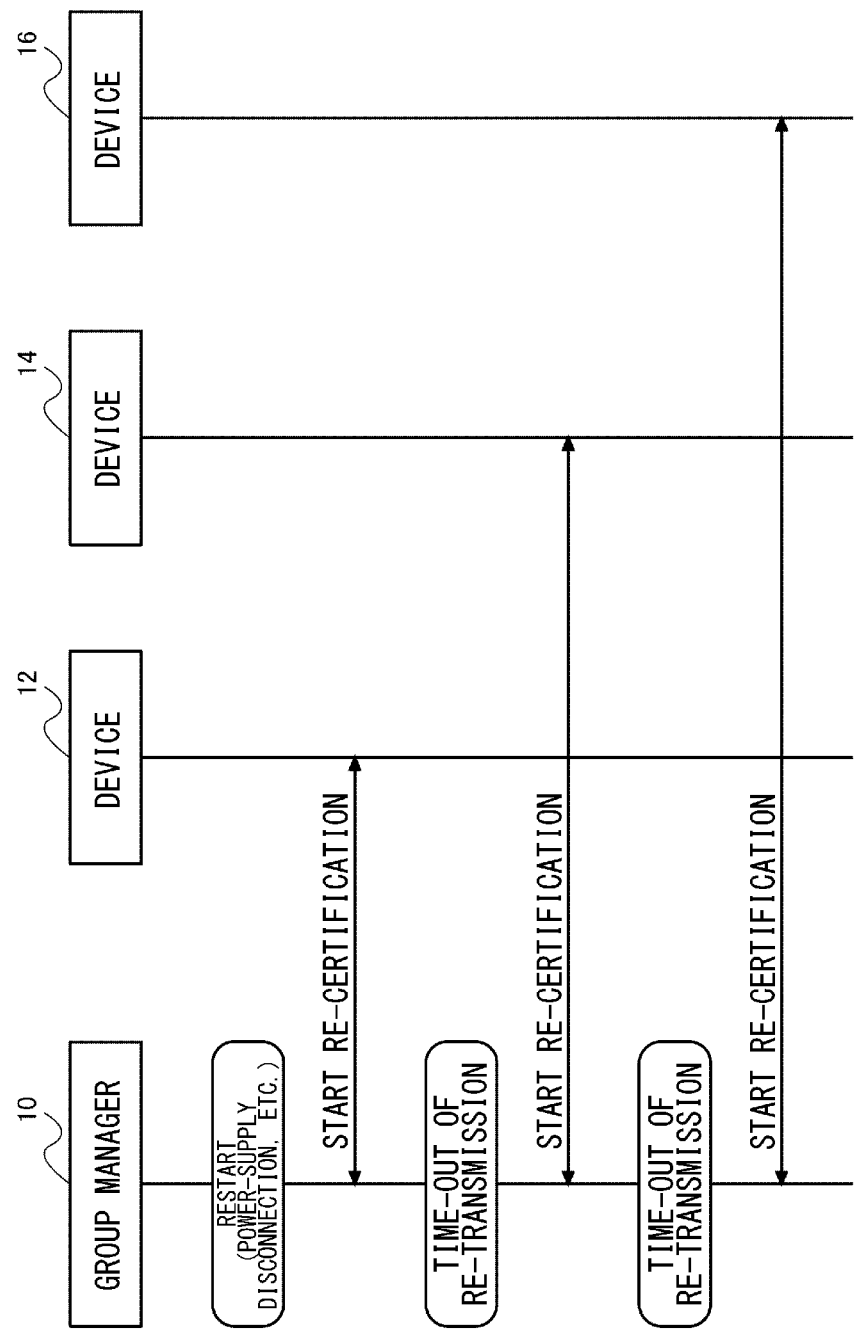
FIG. 2 also shows schematically shows an operation of the group manager after restart.

FIG. 2 also shows schematically shows an operation of the group manager at restart. A power-supply disconnection may be occurring in a device participating in the HEMS network or a relay device (switch, etc.) for relaying communication data when the group manager 10 is restarted. In this case, the group manager 10 and the device participating in the HEMS network may not be able to communicate with each other, or the communication condition may be poor.

In the example of FIG. 2, the group manager 10 attempts to re-certify the device 12 with a failure, detects a time-out after a predefined number of times of retries, and terminates the re-certification process for the device 12. The group manager 10 then attempts to re-certify the device 14 with a failure, detects a time-out after a predefined number of times of retrials, and terminates the re-certification process for the device 14. The group manager 10 then attempts to re-certify the device 16.

In this case, if the number of devices participating in the HEMS network is large, it may take a long period of time before re-certification of the devices (stated otherwise, re-delivery of the group keys) is completed. For example, re-certification of the device 16 is performed after the retries of re-certification of the device 12 have timed out and, further, after the retries of re-certification of the device 14 have timed out. For this reason, it takes a long period of time before the re-certification process (re-delivery of the group key) for the device 16 is completed, even if the condition of communication between the group manager 10 and the device 16 is favorable.

The group manager according to the embodiment (the HEMS controller 22 described later) addresses this by not re-transmitting a request for re-certification to a device at the destination of the request for re-certification, provided that a response is not received from the device (e.g., the device 12). The group manager performs a re-certification process for another device (e.g., the device 14) first. This reduces the time required for a process of re-transmitting a request for re-certification (and for a wait for time-out) and reduces the time required for re-certification of a plurality of devices.

Figure 3:
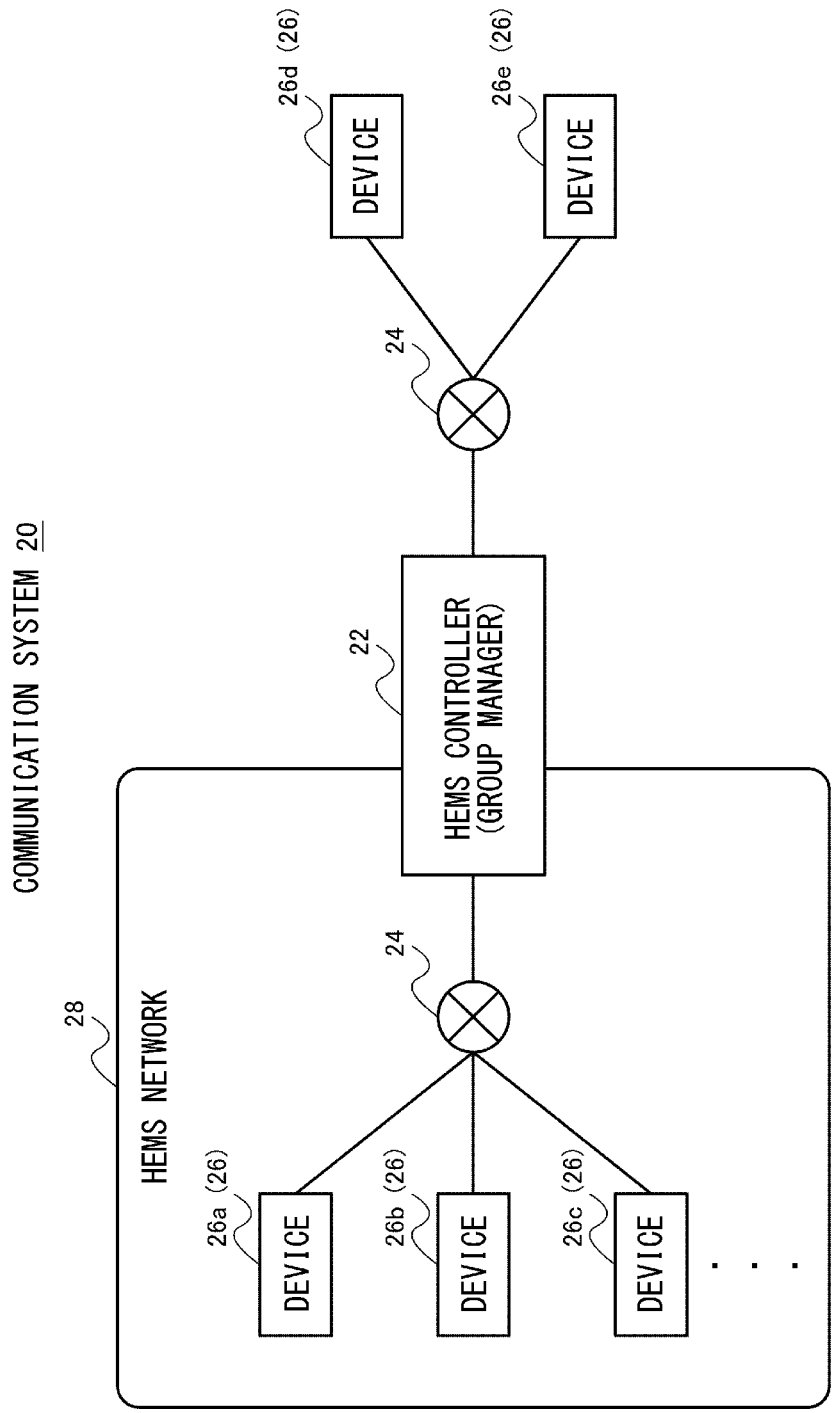
FIG. 3 shows a configuration of a communication system according to the first embodiment.

The embodiment will be described in detail. FIG. 3 shows a configuration of a communication system 20 according to the first embodiment. The communication system 20 is an information processing system in which a plurality of devices each provided with a communication function are coordinated. The plurality of devices include an HEMS controller 22, a device 26a, a device 26b, a device 26c, a device 26d, and a device 26e (generically referred to as "devices 26"). These devices are connected by way of a home network 24 (e.g., wired LAN, wireless LAN, Wi-Fi (registered trademark)).

The HEMS controller 22 is a communication device (i.e., an information processing device) for managing the HEMS in the residence of a user. The HEMS controller 22 may be connected to devices (a server providing various information, the user's cellular phone terminal, etc.) (not shown in FIG. 1) provided outside the residence via the Internet.

The devices 26 include electric facilities, home electric appliances, information devices, and sensors. For example, the devices 26 include lighting, water heaters, storage batteries, air conditioners, smart meters, etc. The device 26a, the device 26b, and the device 26c of FIG. 3 are devices certified by the HEMS controller 22 and permitted to participate in an HEMS network 28. The HEMS controller 22 delivers group keys to the device 26a, the device 26b, and the device 26c. The devices participating in the HEMS network 28 perform encrypted communication by using the group keys delivered from the HEMS controller 22.

Figure 4:
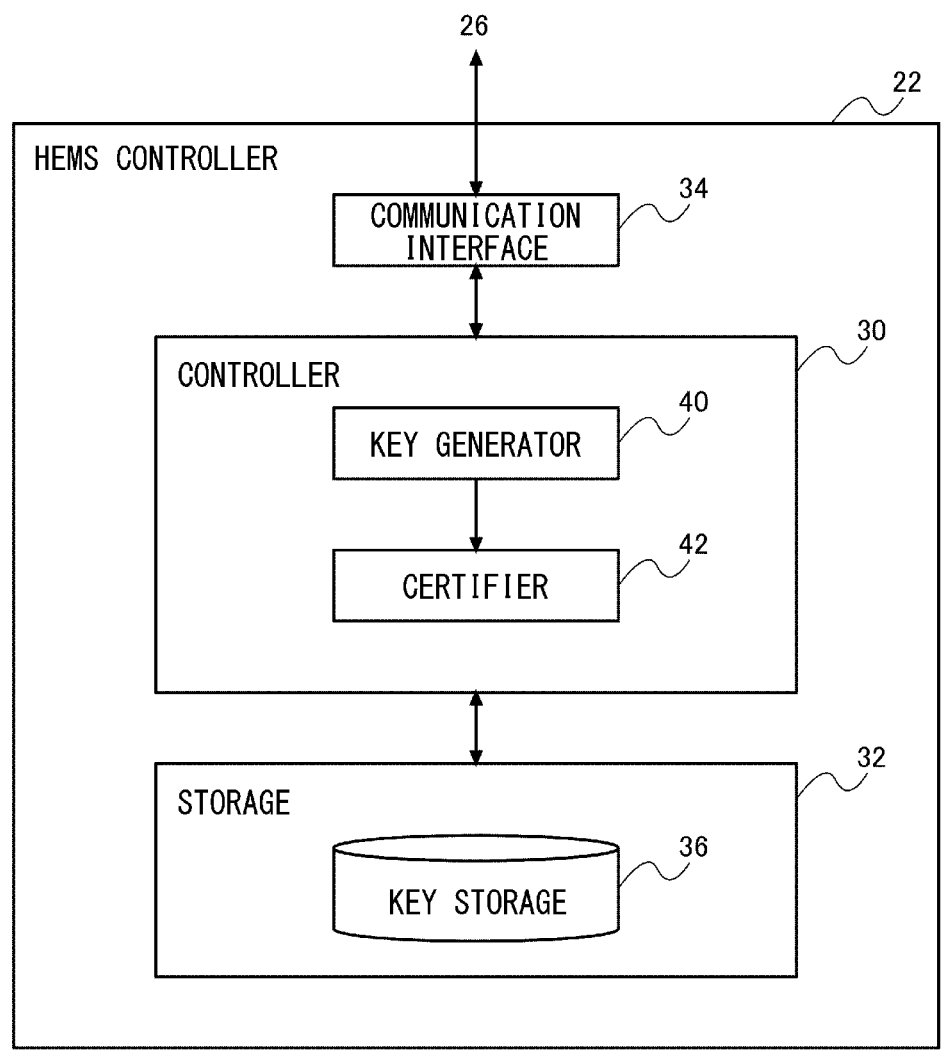
FIG. 4 is a block diagram showing functional blocks of the HEMS controller according to the first embodiment.

FIG. 4 is a block diagram showing functional blocks of the HEMS controller 22 according to the first embodiment. The blocks depicted in the block diagram of this disclosure are implemented in hardware such as devices and mechanical apparatus exemplified by a CPU and a memory of a computer, and in software such as a computer program. FIG. 4 depicts functional blocks implemented by the cooperation of these elements. Therefore, it will be understood by those skilled in the art that the functional blocks may be implemented in a variety of manners by a combination of hardware and software.

The HEMS controller 22 includes a controller 30, a storage 32, and a communication interface 34. The controller 30 performs various data processes as the group manager of the HEMS. The storage 32 stores data referred to or updated by the controller 30. The communication interface 34 communicates with an external device according to a predefined communication protocol. For example, the communication interface 34 communicates with a plurality of devices 26 via the home network 24.

The storage 32 includes a key storage 36. The key storage 36 stores a plurality of group keys delivered to a plurality of devices 26 participating in the HEMS network 28 (hereinafter, referred to as "HEMS participant devices").

The controller 30 includes a key generator 40 and a certifier 42. A computer program implementing these plurality of functional blocks (e.g., a group manager program) may be stored in a recording medium and installed in the storage 32 of the HEMS controller 22 via the recording medium. Alternatively, the above-mentioned computer program may be installed in the storage 32 via a communication network. The CPU of the HEMS controller 22 may exhibit the functions of the functional blocks by reading the above-mentioned computer program into the main memory and running the program.

The key generator 40 generates group keys that are delivered to the plurality of HEMS participant devices and differ from one HEMS participant device to another, in accordance with a predefined algorithm. The key generator 40 stores the group keys thus generated in the key storage 36.

The certifier 42 certifies the plurality of devices 26 by transmitting and receiving data to and from the plurality of devices 26 via the communication interface 34. The certifier 42 allows the device 26 successfully certified to participate in the HEMS network 28 by providing the device 26 successfully certified with the group key generated by the key generator 40. The certifier 42 may perform mutual certification and key sharing by using a publicly known encryption algorithm such as elliptic curve digital signature algorithm (ECDSA) and elliptic curve define Hellman key exchange (ECDH).

The certifier 42 further provides the device 26 successfully certified with a key (hereinafter, referred to as "key delivery key") used to deliver the group key and to encrypt and decrypt the group key. When delivering the group key to a given device 26, the certifier 42 encrypts the group key with the key delivery key provided in advance to the device 26 and transmits encrypted data for the group key to the device 26. The device 26 receiving the encrypted data for the group key decrypts the group key by using the key delivery key provided in advance.

The controller 30 of the HEMS controller 22 may further include a transceiver (not shown in FIG. 4) that transmits and receives, via the communication interface 34, a frame related to the HEMS (a frame including data for a control command, etc.) to and from the HEMS participant device. When data for a control command, etc. should be transmitted to a given HEMS participant device, the transceiver encrypts the data by using the group key stored in the key storage 36 as being associated with the destination device and transmits a frame including the encrypted data.

The HEMS controller 22 is restarted in response to, for example, power-supply disconnection and subsequent recovery. The certifier 42 performs a re-certification process for a plurality of HEMS participant devices in a predefined operating condition or at a predefined point of time (e.g., at restart).

A description will be given of a re-certification process according to the embodiment. The HEMS participant device subject to re-certification will be referred to as "subject device". (1) The certifier 42 transmits a request for re-certification to the subject device. (2) The subject device transmits a response to the request for re-certification to the HEMS controller 22. (3) In the case the response is received within a predefined period of time after the request for re-certification was transmitted, the certifier 42 encrypts a new group key for the subject device by using the key delivery key suited to the subject device and transmits the encrypted data to the subject device.

(4) In the case the new group key is properly decrypted by using the key delivery key provided by the HEMS controller 22 in the past certification, the subject device transmits acknowledgment data indicating that the group key has been properly received to the HEMS controller 22. The subject device may check the message certification code or the originator signature appended to the received encrypted data to verify the safety of the received encrypted data and the originating HEMS controller. In the case the authenticity is verified, the subject device may transmit acknowledgment data to the HEMS controller 22. (5) In the case the acknowledgment data is received from the subject device, the certifier 42 determines that re-certification of the subject device is successful. The scheme for re-certification is not limited to the one described above, and an optional publicly known scheme may be employed.

In the case a request for re-certification is issued to a given HEMS participant device among the plurality of HEMS participant devices and in the case the response in (2) above is not available from that HEMS participant device, the certifier 42 suspends (temporarily terminates) the re-certification process for that HEMS participant device and performs a re-certification process for another HEMS participant device first.

Figure 5:
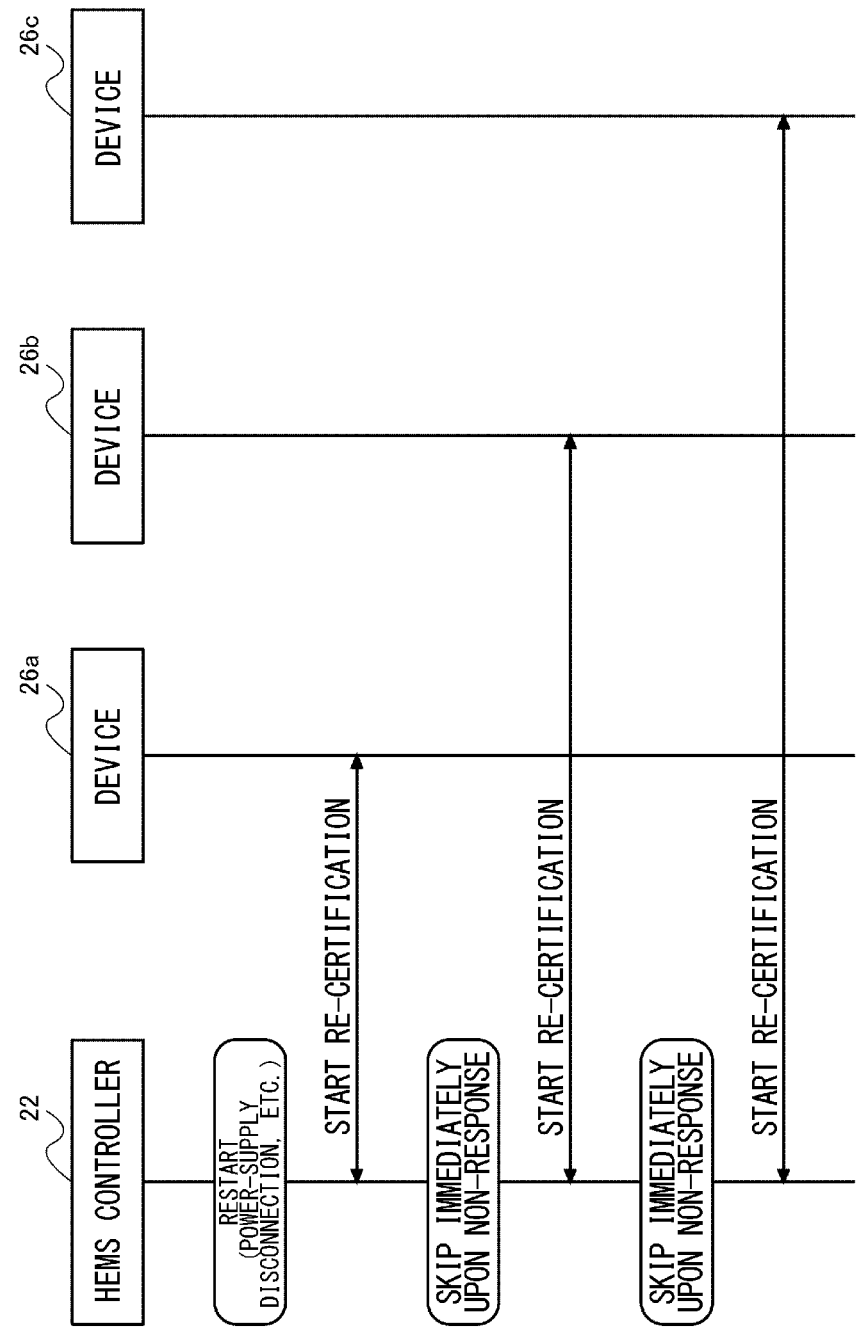
FIG. 5 shows an example of operation in re-certification according to the first embodiment.

FIG. 5 shows an example of operation in re-certification according to the first embodiment. At restart, the certifier 42 of the HEMS controller 22 performs re-certification processes for the device 26a, the device 26b, and the device 26c successively. The certifier 42 transmits a request for re-certification to the device 26a. In the case a response from the device 26a is not received within a predefined period of standby time, the certifier 42 skips the re-certification process for the device 26a and transmits a request for re-certification to the device 26b. The standby time may be determined to suit the characteristic of the HEMS participant device or the transmission medium of the HEMS network. For example, the standby time may be 1-2 seconds.

In the case a response from the device 26b is not received within the predefined period of standby time, the certifier 42 skips the re-certification process for the device 26b and transmits a request for re-certification to the device 26c. When a response from the device 26c is received within the predefined period of standby time, the certifier 42 delivers a new group key to the device 26c and terminates the re-certification process for the device 26c. When the re-certification process for all of the HEMS participant devices subsequent to the device 26c (not shown) is completed, the certifier 42 may perform the re-certification process for a second time for the device 26a and the device 26b for which the re-certification process was skipped.

The HEMS controller 22 of the first embodiment skips re-transmission of a request to a device subject to re-certification in the absence of a response from the device and performs a re-certification process for another device preferentially. Accordingly, the time required for re-certification of a plurality of devices is reduced.

A description will be given of a variation to the first embodiment. The certifier 42 of the HEMS controller 22 may perform re-certification processes for the first HEMS participant device and the second HEMS participant device, which are part of the plurality of HEMS participant devices, in parallel. In the case of re-certifying several tens of HEMS participant devices, for example, the certifier 42 may process re-certification of two or three devices in parallel.

In the case a response to a request for re-certification is available from the first HEMS participant device (e.g., the device 26a) but a response to a request for re-certification is not available from the second HEMS participant device (e.g., the device 26b), the certifier 42 according to this variation continues the re-certification process for the first HEMS participant device (e.g., the device 26a). For example, the certifier 42 provides the group key to the first HEMS participant device. Meanwhile, the certifier 42 suspends the re-certification process for the second HEMS participant device (e.g., the device 26b) and performs a re-certification process for the third HEMS participant device (e.g., the device 26c) first. In other words, the certifier 42 transmits a request for re-certification to the third HEMS participant (e.g., the device 26c) without re-transmitting a request for re-certification to the second HEMS participant device (e.g., the second device 26b).

In the case re-certification processes are performed for some (two or more) of the plurality of HEMS participant devices in parallel, not only the time is reduced by parallelization of the re-certification processes but also the HEMS controller 22 of this variation reduces the time by skipping the re-certification process for the device without a response.

Second Embodiment

The difference of the second embodiment from the first embodiment will mainly be described, and a description of the features common to the embodiments will be omitted. The feature of the second embodiment can be combined as desired with the feature of the first embodiment or the variation.

The configuration of the communication system 20 according to the second embodiment is similar to the configuration (FIG. 3) of the communication system 20 according to the first embodiment. The HEMS controller 22 according to the second embodiment dynamically determines the priority level of re-certification of each device 26 and dynamically determines the sequence of devices 26 subject to a re-certification process.

Figure 6:
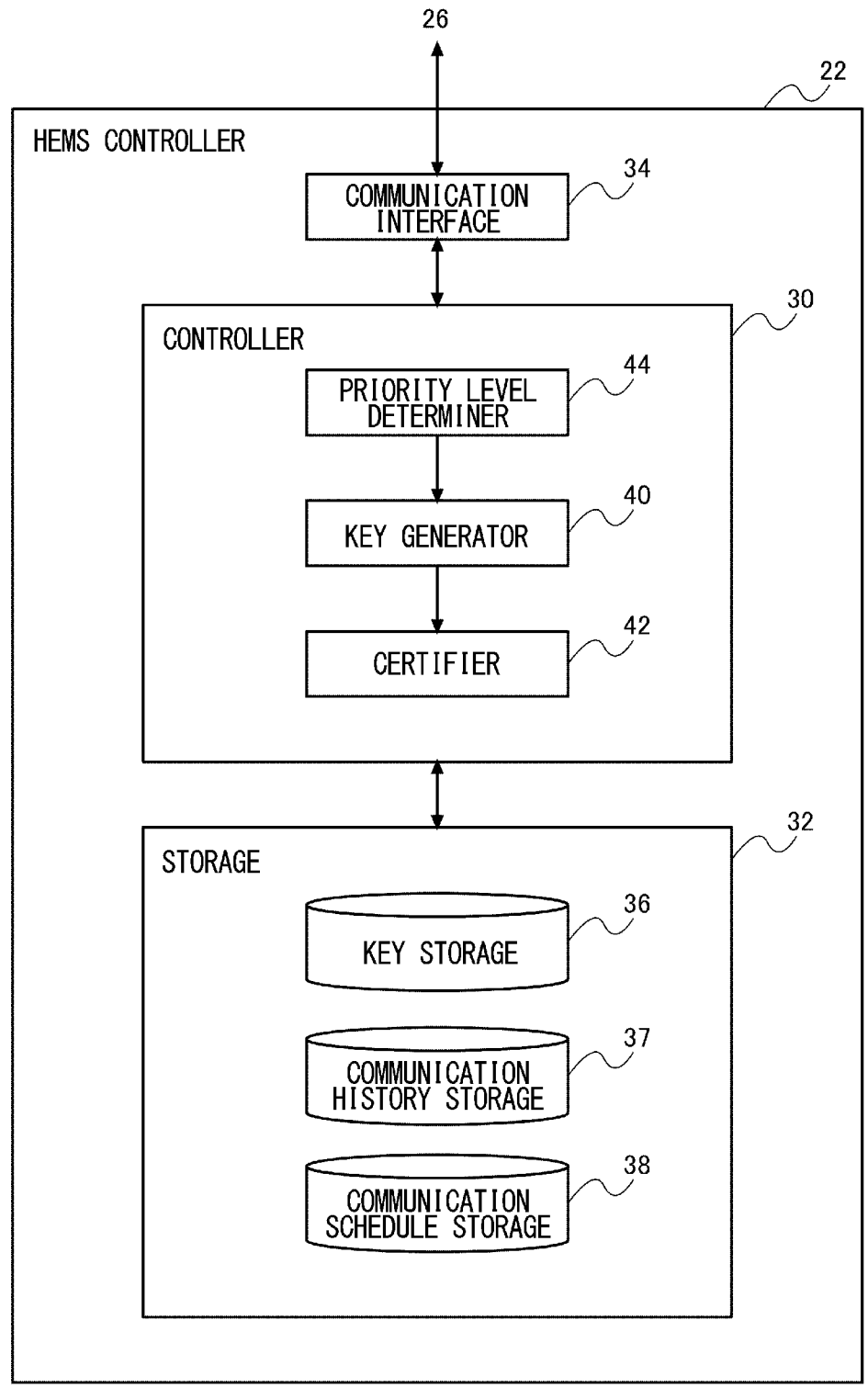
FIG. 6 is a block diagram showing functional blocks of the HEMS controller according to the second embodiment.

FIG. 6 is a block diagram showing functional blocks of the HEMS controller according to the second embodiment. In addition to the functional blocks of the HEMS controller 22 according to the first embodiment, the HEMS controller 22 according to the second embodiment further includes a communication history storage 37, a communication schedule storage 38, and a priority level determiner 44.

The communication history storage 37 stores communication history information on a plurality of HEMS participant devices. The communication history information may include identification information on the HEMS participant device communicating with the HEMS controller in the past, date and time of communication, and detail of communication. The communication schedule storage 38 may store information related to communication scheduled for a plurality of HEMS participant devices (also called communication schedule information). The communication schedule information may include, for example, identification information on the HEMS participant device for which communication is scheduled and detail of communication.

In the case a plurality of HEMS participant devices should be re-certified such as when the power supply recovers from disconnection, the priority level determiner 44 determines the priority level of re-certification of each device based on the history or the schedule of communication associated with each device. For example, the priority level determiner 44 may refer to the communication history information stored in the communication history storage 37 and assign the priority level to the HEMS participant device such that the higher the frequency of communication in the past, the higher the priority level. Alternatively, the priority level determiner 44 may assign a relatively high priority level to the HEMS participant device with which the controller communicated immediately before restart.

Alternatively, the priority level determiner 44 may refer to the communication schedule information stored in the communication schedule storage 38, assign a relatively high priority level to the HEMS participant device for which communication is scheduled, and assign a relatively low priority level to the HEMS participant device for which communication is not scheduled. The HEMS participant device for which communication is scheduled may be the HEMS participant device for which data scheduled to be transmitted is stored in the communication schedule storage 38 when the HEMS controller 22 is restarted.

In the case a plurality of HEMS participant devices should be re-certified, the priority level determiner 44 may determine the priority level of re-certification of each device based on both the history and the schedule of communication associated with each device. For example, the priority level determiner 44 may assign a "high" priority level to the HEMS participant device for which the frequency of communication is high and communication is scheduled. The priority level determiner 44 may assign a "medium" priority level to the HEMS participant device for which the frequency of communication is high but communication is not scheduled and to the HEMS participant device for which the frequency of communication is low but communication is scheduled. The priority level determiner 44 may assign a "low" priority level to the HEMS participant device for which the frequency of communication is low and communication is not scheduled.

The certifier 42 issues a request for re-certification to the HEMS participant device with a relatively high priority level in advance of the HEMS participant device with a relatively lower priority level. Stated otherwise, the higher the priority level of the HEMS participant device among the plurality of HEMS participant devices, the earlier the certifier 42 issues a request for re-certification.

Figure 7:
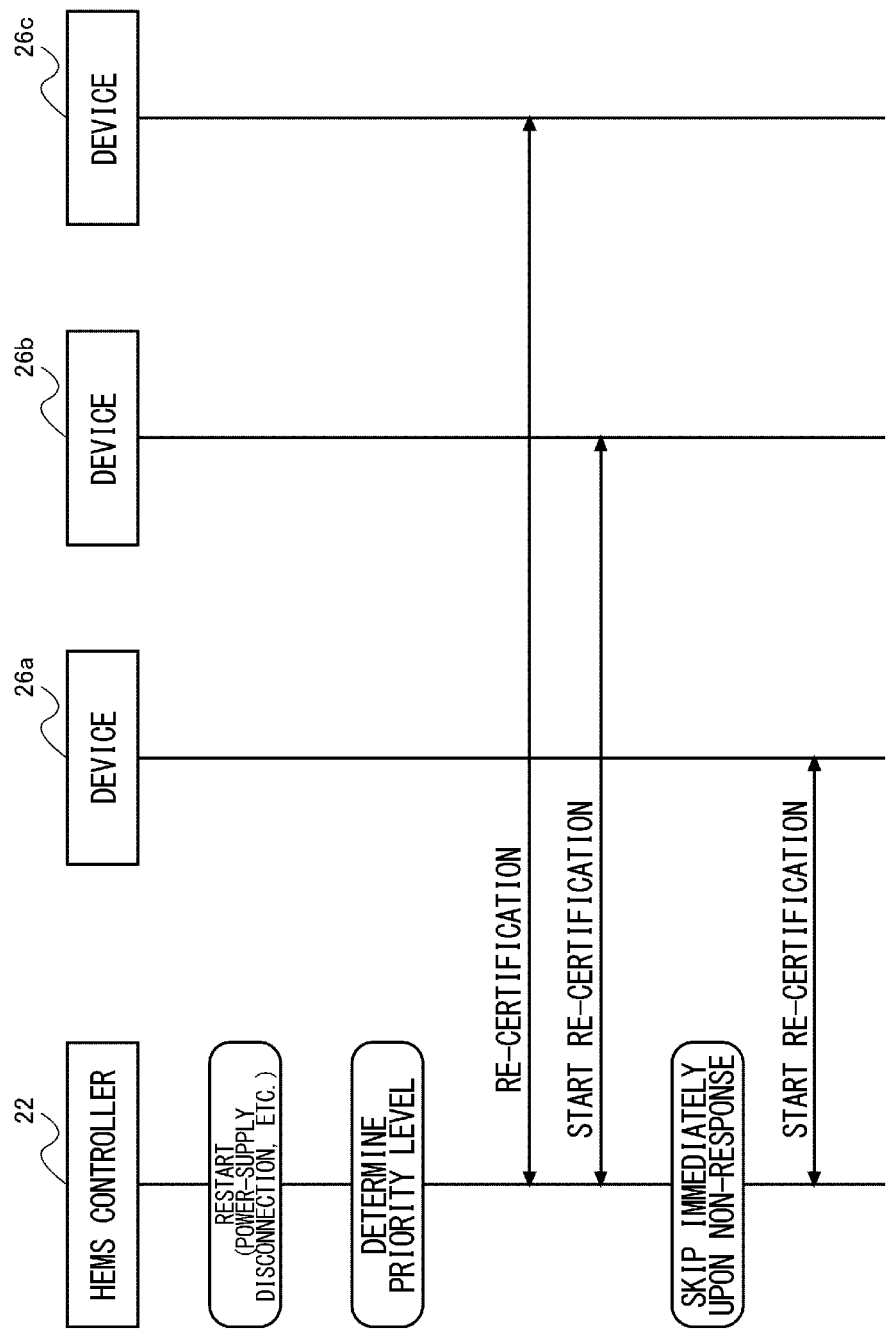
FIG. 7 shows an example of operation in re-certification according to the second embodiment.

FIG. 7 shows an example of operation in re-certification according to the second embodiment. The priority level determiner 44 of the HEMS controller 22 determines the priority level of each of the device 26a, the device 26b, and the device 26c at restart. It is assumed here that the priority level of the device 26c is highest, the priority level of the device 26b is medium, and the priority level of the device 26a is lowest.

First, the certifier 42 transmits a request for re-certification to the device 26c, receives a response, and delivers a new group key to the device 26c. The certifier 42 then transmits a request for re-certification to the device 26b. It is assumed that the certifier 42 does not receive a response from the device 26b within a predefined period of standby time. As described in the first embodiment, the certifier 42 skips the re-certification process for the device 26b and transmits a request for re-certification to the device 26a.

Of the plurality of HEMS participant devices, the HEMS controller 22 according to the second embodiment preferentially re-certifies the HEMS participant device for which the need for restoration of communication is serious. This makes it possible to preferentially restore communication with, for example, the HEMS participant device for which the frequency of communication is high or the HEMS participant device for which communication is scheduled and to reduce the substantive communication down time in the HEMS network 28.

Third Embodiment

The difference of the third embodiment from the first embodiment and the second embodiment will mainly be described below, and a description of the features common to the embodiments will be omitted. The feature of the third embodiment can be combined as desired with the feature of the first embodiment, the second embodiment, or the variation.

The configuration of the communication system 20 according to the third embodiment is similar to the configuration of the communication system 20 according to the first embodiment shown in FIG. 3. The HEMS controller 22 according to the third embodiment delivers only a group key for unicast communication (hereinafter, referred to as "2-node group key") in re-certification. After delivering the 2-node group keys to the devices 26, the HEMS controller 22 delivers a group key for multicast communication (hereinafter, also referred to as "all-node group key") to the plurality of devices 26 at the same time by multicast communication.

The HEMS controller 22 according to the third embodiment includes the same functional blocks as the HEMS controller 22 according to the first embodiment shown in FIG. 4. In one variation, the HEMS controller 22 according to the third embodiment may include the same functional blocks as the HEMS controller 22 according to the second embodiment shown in FIG. 6.

2-node group keys are keys that differ between the pair of the HEMS controller 22 and the device 26a, the pair of the HEMS controller 22 and the device 26b, and the pair of the HEMS controller 22 and the device 26c. The tow-node group key is a key used for encryption and decryption of data for unicast communication in each pair. The key generator 40 generates 2-node group keys that differ from one pair to another. Meanwhile, the all-node group key is a key used for encryption and decryption of data for multicast communication in the HEMS network 28 and is a key used by all of the HEMS controller 22, the device 26a, the device 26b, and the device 26c. The key generator 40 generates the all-node group key common to the HEMS controller 22, the device 26a, the device 26b, and the device 26c (stated otherwise, common in the HEMS network 28).

In the case a plurality of HEMS participant devices should be re-certified such as when the power supply recovers from disconnection, the certifier 42 performs a re-certification process for each HEMS participant device and delivers 2-node group keys that differ from one device to another. After delivering the 2-node group keys to the respective HEMS participant devices, the certifier 42 delivers the all-node group key common to the plurality of HEMS participant devices to the respective HEMS participant devices by multicast communication. The certifier 42 may deliver the all-node group key by multicast communication defined in IEEE802.21-2017.

Figure 8:
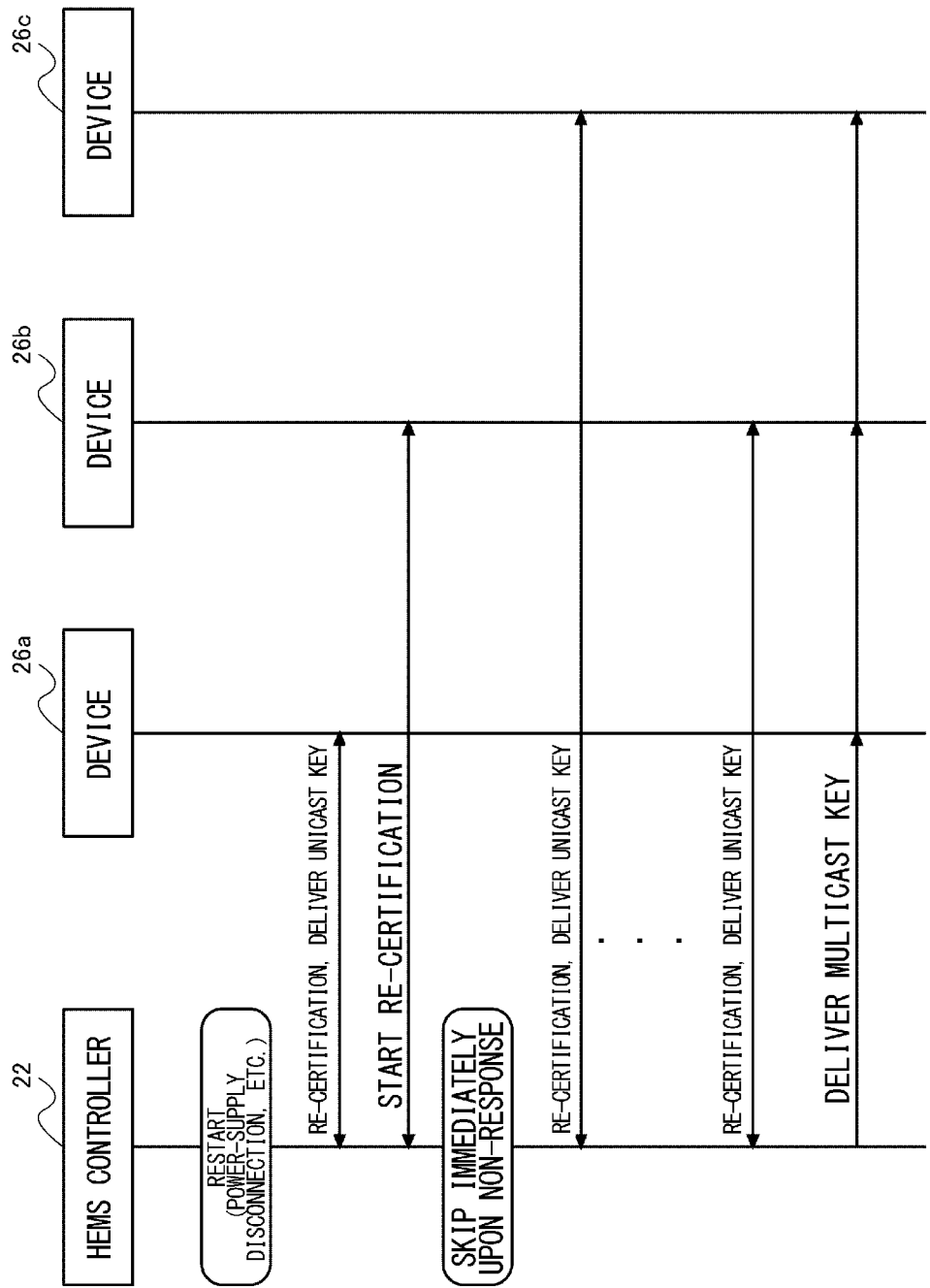
FIG. 8 shows an example of operation in re-certification according to the third embodiment.

FIG. 8 shows an example of operation in re-certification according to the third embodiment. The certifier 42 of the HEMS controller 22 transmits a request for re-certification to the device 26a at restart. When a response from the device 26a is received within a predefined period of standby time, the certifier 42 encrypts a new 2-node group key (unicast key) and delivers the key to the device 26a. The device 26a checks the message certification code or the originator signature appended to the received encrypted data to verify the authenticity of the received encrypted data and the originating HEMS controller.

The certifier 42 then transmits a request for re-certification to the device 26b. In the case a response from the device 26b is not received within a predefined period of standby time, the certifier 42 skips the re-certification process for the device 26b and transmits a request for re-certification to the device 26c. When a response from the device 26c is received within a predefined period of standby time, the certifier 42 encrypts a new 2-node group key and delivers the key to the device 26c. The device 26c checks the message certification code or the originator signature appended to the received encrypted data to verify the authenticity of the received encrypted data and the originating HEMS controller.

When the re-certification process for all of the HEMS participant devices subsequent to the device 26c (not shown) is completed, the certifier 42 retries the re-certification process (i.e., the delivery of the 2-node group key) for the device 26b for which the re-certification process was skipped. When the delivery of the 2-node group keys to the respective HEMS participant devices is complete, the certifier 42 encrypts the all-node group key (multicast key) and delivers the key to the device 26a, the device 26b, and the device 26c at the same time by multicast communication. Each of the device 26a, the device 26b, and the device 26c checks the originator signature appended to the received encrypted data to verify the authenticity of the received encrypted data and the originating HEMS controller.

If a verification process for, for example, verifying a signature is performed at the end of the HEMS participant device when the key is delivered, it takes time to re-certify the HEMS participant device. Further, if the all-node group key is delivered every time the HEMS participant device is re-certified, a long period of time is consumed in individual re-certification processes, and poor efficiency results. The HEMS controller 22 according to the third embodiment is capable of restoring communication in the HEMS network 28 promptly and improving the efficiency of key delivery, by delivering, in re-certification, the 2-node group key to restore unicast communication first and ultimately delivering the all-node group key at the same time by multicast communication.

The HEMS controller 22 according to the third embodiment is provided with: (feature 1) whereby, in the case a request for re-certification is issued to a given HEMS participant device and a response from that HEMS participant device is not available, the HEMS controller 22 does not re-transmit the request and performs a re-certification process for another HEMS participant device (i.e., the feature described in the first embodiment); and (feature 2) whereby, in re-certification, the 2-node group key is delivered, and, ultimately, the all-node group key is delivered by multicast communication. In one variation, the HEMS controller 22 provided with only feature 2 is also useful. This HEMS controller 22 is also capable of restoring communication in the HEMS network 28 promptly and improving the efficiency of key delivery.

Given above is a description of the disclosure based on the first-third embodiments. The embodiments is intended to be illustrative only and it will be understood by those skilled in the art that various modifications to constituting elements and processes could be developed and that such modifications are also within the scope of the present disclosure.

Variations that can be applicable to any of the first embodiment-third embodiment will be described. The storage 32 of the HEMS controller 22 may further include a counter storage that stores a plurality of frame counter corresponding to a plurality of HEMS participant devices. The frame counter in this case is configured as a reception counter in which the frame counter value included in the latest frame received from the HEMS participant device is recorded.

The controller 30 of the HEMS controller 22 further includes a transceiver that transmits and receives a frame related to HEMS (frame including a control command, etc.) to and from the HEMS participant devices via the communication interface 34. When a frame transmitted from a given HEMS participant device is received, the transceiver updates, of the plurality of frame counters (reception counters) stored in the counter storage, the frame counter (reception counter) corresponding to the transmitting HEMS participant device with the frame counter value included in the received frame.

The frame transmitted from the HEMS participant device includes a frame counter value (the number assigned to the frame transmitted to the destination) for each destination managed by the transmitting HEMS participant device (also referred to as "transmitting device"). The frame counter value included in the frame transmitted from a given transmitting device is a value larger than the reception counter value stored in the counter storage as corresponding to the transmitting device.

When a frame transmitted from a given transmitting device is received, the transceiver of the HEMS controller 22 compares the frame counter value included in the frame with the reception counter value corresponding to the transmitting device. In the case the frame counter value is smaller than the reception counter value, the HEMS controller discards the received frame. This prevents a replay attack.

In this variation, the certifier 42 (or the transceiver) of the HEMS controller 22 resets, in re-certification of a given HEMS participant device, the frame counter value stored in the counter storage as corresponding to the HEMS participant device, in addition to or in place of delivering the group key to the HEMS participant device. For example, the HEMS controller 22 may return the frame counter value to the initial value. In this case, the HEMS participant device also resets the frame counter value in re-certification. This prevents loss of synchronization of frame counters between the HEMS controller 22 and the HEMS participant device.

Any combination of the embodiment and a variation will also be useful as an embodiment of the present disclosure. A new embodiment created by a combination will provide the combined advantages of the embodiment and the variation as combined. It will be understood by skilled person that the functions that should be achieved by the constituting elements recited in the claims are implemented either alone or in combination by the constituting elements shown in the embodiments and the variations.

The technology described in the embodiment and the variations may be defined by the following items.

[Item 1]

A communication device (22) including: a communication interface (34) that communicates with a plurality of devices participating in a network (28); and a certifier (42) that certifies the plurality of devices (26) via the communication interface (34), wherein, when a request for re-certification is issued to a given device (26) among the plurality of devices (26) and when a response is not available from the device (26), the certifier suspends a re-certification process for the device (26) and performs a re-certification process for another device (26) first.

[Item 2] The communication device (22) according to Item 1, wherein the certifier (42) performs re-certification processes for a first device (26) and a second device (26), which are part of the plurality of devices (26), in parallel, and, when a response to a request for re-certification is available from the first device (26) but a response to a request for re-certification is not available from the second device (26), the certifier (42) continues the re-certification process for the first device (26), suspends the re-certification process for the second device (26), and performs a re-certification process for a third device (26) first.

[Item 3]

The communication device (22) according to Item 1 or 2, further including: a determiner (44) that determines, when the plurality of devices (26) should be re-certified, a priority level of re-certification of each device (26), based on a history or a schedule of communication associated with each device (26), wherein the certifier (42) issues a request for re-certification to the device (26) with a higher priority level in advance of the device (26) with a lower priority level.

[Item 4]

The communication device (22) according to any one of Items 1 through 3, wherein when the plurality of devices (26) should be re-certified, the certifier (42) performs a re-certification process for each device (26), provides keys for unicast communication that differ from one device (26) to another, and provides, after the keys for unicast communication are provided to the respective devices (26), a key for multicast communication common to the plurality of devices (26) to the respective devices (26) by multicast communication.

[Item 5]

A communication device (22) including: a communication interface (34) that communicates with a plurality of devices (26) participating in a network (28); and a certifier (42) that certifies the plurality of devices (26) via the communication interface, wherein, when the plurality of devices (26) should be re-certified, the certifier (42) performs a re-certification process for each device (26), provides keys for unicast communication that differ from one device (26) to another, and provides, after the keys for unicast communication are provided to the respective devices (26), a key for multicast communication common to the plurality of devices (26) to the respective devices (26) by multicast communication.

[Item 6]

A certification method including: issuing, using a communication device (22) that certifies a plurality of devices (26) participating in a network (28), a request for re-certification to a device among the plurality of devices (26); and, when a response from the device (26) to which the request for re-certification is issued is not available, suspending, using the communication device, a re-certification process for the device (26) and performing a re-certification process for another device (26) first.

[Item 7]

A computer-readable recording medium encoded with a computer program comprising computer-implemented modules including: a module that issues, using a communication device (22) that certifies a plurality of devices (26) participating in a network (28), a request for re-certification to a device (26) among the plurality of devices (26); and a module that, when a response from the device (26) to which the request for re-certification is issued is not available, suspends, using the communication device, a re-certification process for the device (26) and performed a re-certification process for another device (26) first.

What is claimed is:

1. A communication device comprising:
a processor programmed to:
control communication with a plurality of devices participating in a network, the plurality of devices including a first device, a second device, and a third device; and
certify the plurality of devices,
wherein when the communication device recovers from a power-down, the processor is further programmed to simultaneously send a first request for re-certification to the first device and a second request for re-certification to the second device,
wherein the first and second requests are initial requests for the first and second devices, respectively, to respond to the communication device,
wherein when the first device does not respond to the first request and the second device responds to the second request, the processor is programmed to skip the re-certification to the first device, continue the re-certification to the second device, and send a third request for re-certification to the third device,
wherein the processor is further programmed to, when the plurality of devices is required to be re-certified, determine a priority level of re-certification of each device, based on a history or a schedule of communication associated with each device; and
wherein when the plurality of devices includes a fourth device and the fourth device is given a highest priority level, the processor is programmed to send a fourth request for re-certification to the fourth device before sending the first request for re-certification to the first device and the second request for re-certificate to the second device.

2. A communication device comprising:
a processor programmed to:
control communication with a plurality of devices participating in a network, the plurality of devices including a first device, a second device, and a third device; and
certify the plurality of devices,
wherein when the communication device recovers from a power-down, the processor is further programmed to simultaneously send a first request for re-certification to the first device and a second request for re-certification to the second device,
wherein the first and second requests are initial requests for the first and second devices, respectively, to respond to the communication device,
wherein when the first device does not respond to the first request and the second device responds to the second request, the processor is programmed to skip the re-certification to the first device, continue the re-certification to the second device, and send a third request for re-certification to the third device, and
wherein when the plurality of devices are re-certified, the processor is programmed to perform a re-certification process for each device, provide keys for unicast communication that differ from one device to another to the devices, respectively, and provide, after the keys for unicast communication are provided respectively to the devices, a key for multicast communication common to the plurality of devices to the respective devices by multicast communication.

3. A certification method for a communication device that certifies a plurality of devices participating a network, wherein the plurality of devices includes a first device, a second device, and a third device, the certification method comprising:
in response to the communication device recovering from a power-down, simultaneously sending a first request for re-certification to the first device and a second request for re-certification to the second device, wherein the first and second requests are initial requests for the first and second devices, respectively, to respond to the communication device; and
in response to the first device not responding to the first request and the second device responding to the second request, skipping the re-certification to the first device, continuing the re-certification to the second device, and sending a third request for re-certification to the third device;
wherein in response to the plurality of devices being required to be re-certified, a priority level of re-certification of each device is determined based on a history or a schedule of communication associated with each device; and
wherein in response to the plurality of devices including a fourth device and the fourth device is given a highest priority level, a fourth request for re-certification is sent to the fourth device before the first request for re-certification is sent to the first device and the second request for re-certificate is sent to the second device.

4. A certification method for a communication device that certifies a plurality of devices participating a network, wherein the plurality of devices includes a first device, a second device, and a third device, the certification method comprising:
in response to the communication device recovering from a power-down, simultaneously sending a first request for re-certification to the first device and a second request for re-certification to the second device, wherein the first and second requests are initial requests for the first and second devices, respectively, to respond to the communication device; and
in response to the first device not responding to the first request and the second device responding to the second request, skipping the re-certification to the first device, continuing the re-certification to the second device, and sending a third request for re-certification to the third device,
wherein in response to the plurality of devices being re-certified, a re-certification process for each device are performed, keys for unicast communication that differ from one device to another is provided to the devices, respectively, and after the keys for unicast communication are provided respectively to the devices, a key for multicast communication common to the plurality of devices is provided to the respective devices by multicast communication.

* * * * *